(12) United States Patent
Beisiegel et al.

(10) Patent No.: US 7,793,303 B2
(45) Date of Patent: Sep. 7, 2010

(54) APPARATUS, SYSTEM, AND METHOD FOR SERVICE COMPONENT QUALIFIERS FOR THE DECLARATIVE SPECIFICATION OF QUALITY OF SERVICE

(75) Inventors: Michael Beisiegel, Poughkeepsie, NY (US); David Andrew Booz, Rhinebeck, NY (US); Jean-Sebastien Michel Delfino, San Carlos, CA (US); Zhaohui Feng, Fremont, CA (US); Jason Robert McGee, Apex, NC (US); Martin Paul Nally, Laguna Beach, CA (US); Peter David Niblett, Whitechurch (GB)

(73) Assignee: International Business Machines Corporation, Armonk, NY (US)

( * ) Notice: Subject to any disclaimer, the term of this patent is extended or adjusted under 35 U.S.C. 154(b) by 995 days.

(21) Appl. No.: 11/466,417

(22) Filed: Aug. 22, 2006

(65) Prior Publication Data
US 2008/0052503 A1 Feb. 28, 2008

(51) Int. Cl.
*G06F 15/163* (2006.01)
(52) U.S. Cl. .................. 719/316; 719/330; 709/203
(58) Field of Classification Search ................ 719/330, 719/316
See application file for complete search history.

(56) References Cited

U.S. PATENT DOCUMENTS

| | | | |
|---|---|---|---|
| 6,223,222 B1 | 4/2001 | Fijolek et al. ............... 709/227 |
| 2003/0033398 A1 | 2/2003 | Carlson et al. .............. 709/223 |
| 2004/0003080 A1 | 1/2004 | Huff ........................... 709/225 |
| 2004/0098606 A1* | 5/2004 | Tan et al. ..................... 713/200 |
| 2005/0086360 A1* | 4/2005 | Mamou et al. .............. 709/232 |
| 2006/0136555 A1* | 6/2006 | Patrick et al. ............... 709/203 |
| 2006/0150204 A1* | 7/2006 | Beisiegel et al. ............ 719/330 |
| 2006/0248351 A1 | 11/2006 | Booz et al. .................. 713/189 |

OTHER PUBLICATIONS

Wang, G., et al. Integrated Quality of Service (QoS) Management in Service-Oriented Enterprise Architectures. Enterprise Distributed Object Computing Conference, 2004. EDOC 2004. Proceedings. Eighth IEEE International. (Sep. 20-24, 2004) pp. 21-32.*

(Continued)

*Primary Examiner*—Hyung S Sough
*Assistant Examiner*—Brian Wathen
(74) *Attorney, Agent, or Firm*—Kunzler Needham Massey & Thorpe

(57) ABSTRACT

An apparatus and system are disclosed for implementing service qualifiers that define on-demand management requirements for a loosely coupled software service in a service component architecture (SCA) for an integration server by associating a service qualifier with one or more of an SCA service reference, an SCA wire, an SCA interface, or an SCA implementation based on an SCA component definition, requiring the integration server to augment an implementation execution for the SCA service to honor the service qualifier; and accepting user modification and definition of declarative service qualifiers. By allowing the association of service qualifiers with SCA service references, SCA wires, SCA interfaces, and SCA implementations, additional quality of service with which components are executed can be maintained.

3 Claims, 2 Drawing Sheets

OTHER PUBLICATIONS

Subramaniam, V.R., Chen-Khong Tham. Integrating Network QoS to Provide Differentiated Service in a Web Server. Performance, Computing, and Communications Conference, 2002. 21st IEEE International. (Apr. 3-5, 2002) pp. 369 - 374.*

Rudack, M., Jobmann, K., Pajares, A., and Esteve, M. Policy-Based Quality of Service Mapping in Distributed Systems. Network Operations and Management Symposium, 2002. NOMS 2002. 2002 IEEE/IFIP. (Apr. 15-19, 2002) pp. 947 - 949.*

Coulouris, G., J. Dollimore, and Tim Kindberg. Distributed Concepts and Desgin. 3rd Edition. England. Persion Education Ltd. (2001). pp. 614-619.*

Open SCA Collaboration (OSOA). SCA Service Component Architecture Assembly Specification V0.9. Nov. 2005. [retrieved Oct. 14, 2009]. Retrieved from the Internet: <http://www.osoa.org/download/attachments/28/SCA_AssemblyModel_V09.pdf?version=1>.*

SCA Service Component Architecture: Assembly Model Specification. Version 0.96 (Aug. 2006). [retrieved from http://www.osoa.org/download/attachments/35/SCA_AssemblyModel_V096.pdf?version=1 on Apr. 19, 2010].*

Siljee, J.; Bosloper, I.; Nijhuis, J.; Hammer, D. DySOA: Making Service Systems Self-Adaptive. Necture Notes in Computer Science. vol. 3826/2005. Springer, Berline (Nov. 29,2005). pp. 255-268. [retrieved from http://www.springerlink.com/content/y7168t885843k031/fulltext.pdf on Apr. 19, 2010].*

\* cited by examiner

APPARATUS, SYSTEM, AND METHOD FOR SERVICE COMPONENT QUALIFIERS FOR THE DECLARATIVE SPECIFICATION OF QUALITY OF SERVICE

BACKGROUND OF THE INVENTION

1. Field of the Invention

This invention relates to Service Component Architecture (SCA) and more particularly to methods for service component qualifiers in a Service Component Architecture.

2. Description of the Related Art

The Service Component Architecture (SCA) is a specification put forward by software vendors with the objective of simplifying how organizations create and implement applications in a Service Oriented Architecture (SOA). SCA is included in the SOA Programming Model along with Service Data Objects (SDO), which allow heterogeneous data to be accessed and manipulated in a uniform manner.

An SCA is based on service components which may be configured to provide services, consume other services, or both. These service components may be packaged together with import components and export components into SCA modules, and communicate with one another using SCA messages. The import and export components define a module's external interfaces or access points. These import and export components typically require binding information, which specifies the means of transporting data to and from the SCA modules. For example, the import and export components of SCA modules may be used to access or provide services to external systems or services over various transport protocols, such as IIOP, HTTP, SOAP, and JMS.

The service interface between two communicating service components may require exchange of certain information. In addition, the runtime environments that execute the SCA components may need to exchange certain information related to the quality and expectations for the communications and/or service. Existing component models, such as Java 2 Platform enterprise edition (J2EE) or .NET™ are limited to exchanging quality information at the interface level, rather than at the service level, and extensibility of definitions of quality information is not available.

From the foregoing discussion, it should be apparent that a need exists for an apparatus, system, and method for service component qualifiers for quality of service in component execution at different levels in the SOA architecture. Beneficially, such an apparatus, system, and method would be flexible enough to be able to define additional quality of service requirements with which components should be executed. This should be possible without the requirement to change the implementation of a component. Additionally, a user should be allowed to define new service qualifiers if need arises. The attachment of qualifiers should also not be limited to just the interfaces of components.

SUMMARY OF THE INVENTION

The present invention has been developed in response to the present state of the art, and in particular, in response to the problems and needs in the art that have not yet been fully solved by currently available products and systems. Accordingly, the present invention has been developed to provide an apparatus, system, and method for service component qualifiers of quality of service (QoS) that overcome many or all of the above-discussed shortcomings in the art.

A system to implement service qualifiers that define on-demand management requirements for a loosely coupled, platform independent software service in a service component architecture (SCA) for an integration server is provided. The system may be embodied by an SCA service provider configured to supply an SCA service wherein the SCA service is loosely coupled and platform-independent, a service architecture configured to facilitate communication of an SCA service, an integration server configured to act as an intermediary between SCA service providers, and a service manager module configured to associate a service qualifier with one or more of a service reference, an SCA wire, an SCA interface, and an SCA implementation based on an SCA component definition, and require the integration server to augment an implementation execution for the SCA service to honor the service qualifier.

The service manager module in the system may further include a structure for new, user-defined, declarative service qualifiers. In another embodiment, the service manager module in the system may include one or more standard, pre-defined service qualifiers.

The system, in another embodiment, may include a service qualifier definition including a declarative statement within one or more of a service reference, an SCA wire, an SCA interface, and an SCA implementation based on SCA component definition.

The apparatus for service component qualifiers of quality of service (QoS) is provided with a plurality of modules configured to functionally execute the necessary steps to associate a service qualifier with various SCA components, require an integration server to honor the service qualifier, and accept modification and definition of existing or new service qualifiers.

The apparatus, in one embodiment, is a computer program product comprising a computer readable medium having computer usable program code programmed for implementing service qualifiers that define on-demand management requirements for a loosely coupled, platform independent software service in service component architecture (SCA) for an integration server, the computer program product when executed on a computer causes the computer to associate a service qualifier with one or more of an SCA service reference, an SCA wire, an SCA interface, or an SCA implementation based on an SCA component definition; require the integration server to augment an implementation execution for the SCA service to honor the service qualifier; and accept user modification and definition of new or existing declarative service qualifiers.

In one embodiment, the computer program product may be further configured to associate more than one service qualifier with an SCA service.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
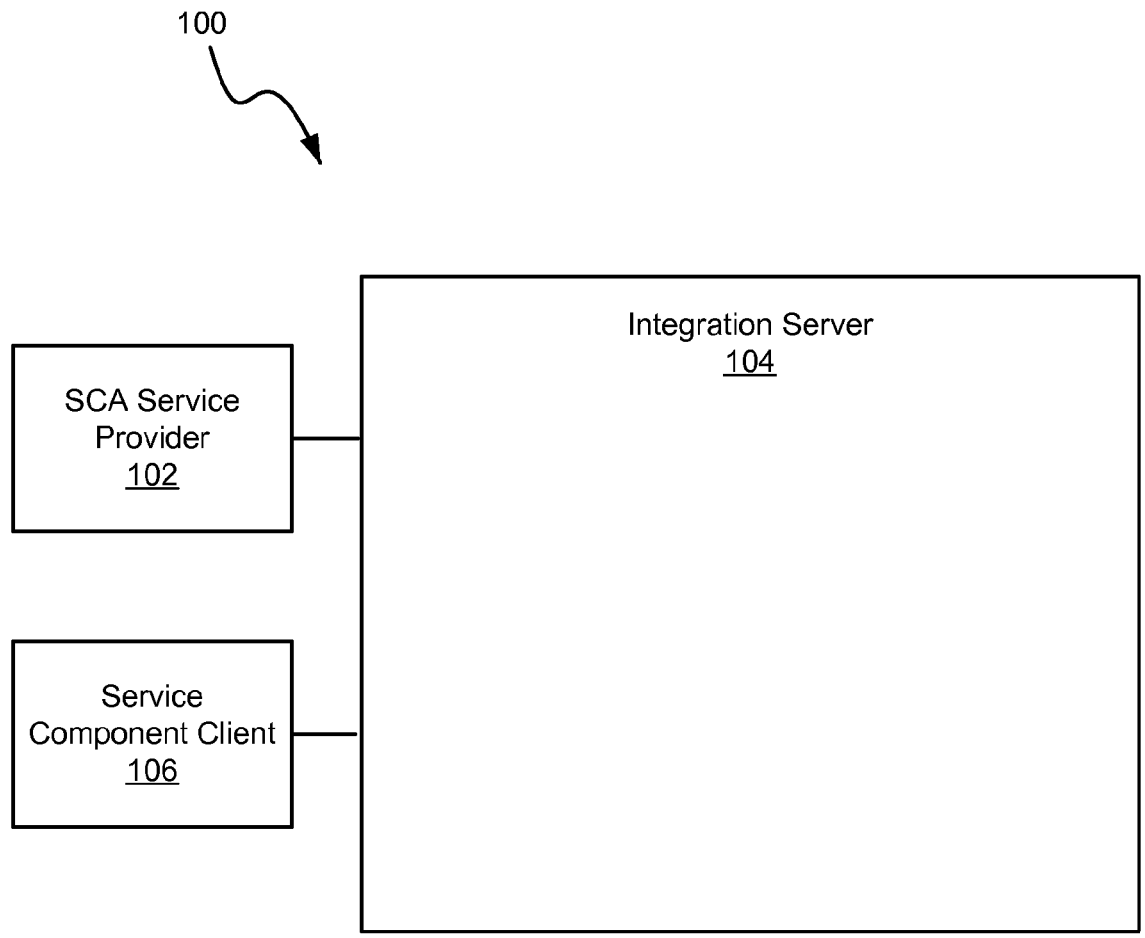
FIG. 1 is a schematic block diagram illustrating one embodiment of a system 100 for accessing and manipulating enterprise information systems (EIS) resources in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable storage medium may take any form capable of storing machine-readable instructions on a digital processing apparatus. A computer readable storage medium may be embodied by a compact disk, digital-video disk, a magnetic tape, a Bernoulli drive, a magnetic disk, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 illustrates one embodiment of a system 100 for accessing and manipulating enterprise information systems (EIS) resources. Included in the system 100 are a service component architecture (SCA) service provider 102, an integration server 104, and a service component client 106. The system 100 for accessing and manipulating EIS resources enables the sharing of services between an SCA service provider 102 and a service component client 106.

The SCA service provider 102, in one embodiment, supplies a business function for use by other elements of the system. A business function is a loosely coupled, platform-independent resource wherein the implementation of the resource is separated from the resource itself, resulting in reusable, replaceable resources. Examples of an EIS service provider 102 include SAP™, BPEL, Oracle™ and the like.

The integration server 104, in one embodiment, automates business processes by integrating business functions that span workflows, applications, systems, platforms, and/or architectures. In one embodiment, the integration server 104 binds an export from an SCA service provider 102 to an import of a service component client 106. An example of an integration server 104 is IBM WebSphere Process Server™. In addition, the integration server 104 serves as an SCA runtime component that executes one or more SCA components. The integration server 104 may execute the service component client 106 or a middleware component that communicates with the service component client 106. Similarly, the integration server 104 may execute the middleware component that communicates with the SCA service provider 102.

The service component client 106, in one embodiment, receives a business resource supplied by an SCA service provider 102. The business resource received by the service component client 106 conforms to a definition as required by the service component client 106, resulting in a loose coupling between the service component client 106 and the SCA service provider 102. Examples of business resources include an SCA service and a service data object (SDO). In one embodiment, the service component client 106 or SCA service provider 102 require that the business resource be processed with service qualifiers that define quality and performance expectations for the resource.

Figure 2:
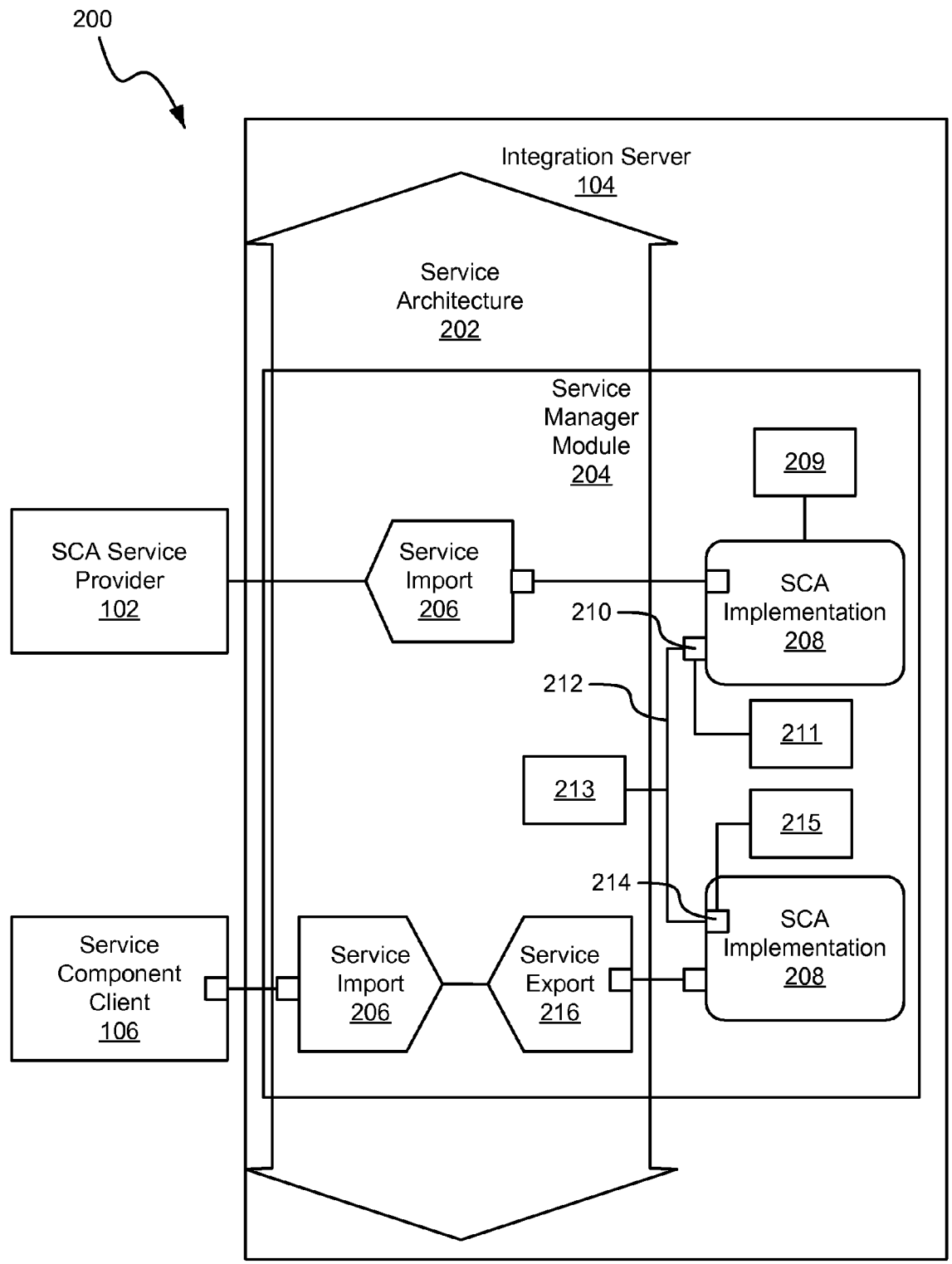
FIG. 2 is a schematic block diagram illustrating one embodiment of an apparatus for implementing service qualifiers in accordance with the present invention.

FIG. 2 illustrates one embodiment of an apparatus 200 for implementing service qualifiers. Included in the apparatus 200 are an integration server 104, a service architecture 202, and a service manager module 204. The apparatus 200 for implementing service qualifiers enables the sharing of services with service qualifiers between an SCA service provider 102 and a service component client 106.

In one embodiment, the integration server 104 includes a service architecture 202 and a service manager module 204. The integration server 104, in one embodiment, automates business processes by integrating business functions. An example of an integration server 104 is IBM WebSphere Process Server™.

The service architecture 202 enables communication between an SCA service provider 102 and a service component client 106 and provides a medium for exposing and accessing business resources. The service architecture 202 may include zero or more service imports 206 and zero or more service exports 216. An SCA service provider 102 may access the service architecture 202 to expose a business resource to a service component client 106. A service component client 106 may access the service architecture 202 to access business resources provided by an SCA service provider 102. An example of a service architecture 202 is a service interface bus (SIBus).

A service import 206, in one embodiment, represents an access point for an external business resource. A business resource can be imported through a service import 206 for use by elements of the apparatus 200. A service export 208, in one embodiment, allows a business resource to be passed from an element of the apparatus 200 to other elements of the apparatus and/or to a service component client 106.

In one embodiment, the service manager module 204 controls how business functions are related as they are passed between components of the apparatus 200. The service manager module 204, in one embodiment, includes zero or more service imports 206, zero or more service exports 216, zero or more SCA implementations 208, zero or more SCA interfaces 210, zero or more SCA wires 212, and zero or more SCA references 214. The service manager module 204 manages how service imports 206, SCA implementations 206, and/or service exports 216 interact as they pass business resource information.

An SCA implementation 208, in one embodiment, is a definition of logic for facilitating exchange of information between the service component client 106 and the SCA service provider 102. In one embodiment, the SCA implementation 208 includes zero or more SCA interfaces 210 and zero or more SCA references 214. The SCA implementation 208 may comprise a Java class, a BPEL process, or the like.

In one embodiment, the SCA implementation 208 may have an associated implementation service qualifier 209 that controls how the SCA implementation 208 is processed by the integration server 104. The integration server 104, in one embodiment, may be required to honor the implementation service qualifier 209 by augmenting the processing of an SCA message or the SCA implementation 208 to satisfy the requirements of the implementation service qualifier 209. Examples of implementation service qualifiers 209 include transaction qualifiers, security qualifiers, asynchronous reference qualifiers, and so on. A service qualifier defines an expected level of performance by the components involved in satisfying a particular SCA interaction. Service qualifiers may set a limit for a maximum response time, a maximum amount of bandwidth used, a minimum error or recovery rate, a set of logging criteria, a certain type of communication protocol that is to be used, a certain level of redundancy, and the like. Advantageously, the present invention permits service qualifiers to be defined and associated with different levels of the SCA components including the interfaces 210, wires 212, and references 214.

The implementation service qualifier 209, in one embodiment, may require the integration server 104 to process the SCA implementation 208 with requirements specified by the implementation qualifier 209. For example, a security qualifier associated with an SCA implementation 208 may require that security credentials be provided before processing the SCA implementation 209. In this example, the integration server 104 honors the requirements set forth in the implementation service qualifier 209 and does not process the SCA implementation 208 unless the security credential is provided.

In one embodiment, an implementation service qualifier 209 associated with an SCA implementation 208 is defined by a declarative statement consisting of human readable code processed by an interpreter and written in a markup language, such as service component definition language (SCDL) derived from XML. In another embodiment, the service manager module 204 includes one or more predefined, standard service qualifiers that can be associated with SCA interfaces 210, wires 212, and/or references 214. In a further embodiment, more than one implementation service qualifier 209 may be associated with an SCA implementation 208. Advantageously, defining service qualifiers by way of a declarative statement allows for service qualifiers to be added, removed, or modified without changing the SCA runtime software such as the integration server 104.

In another embodiment, the service manager module 204 is configured to allow a user to define an implementation service qualifier 209 that may be associated with an SCA implementation 208 that requires the integration server 104 to augment the processing of an SCA implementation 208 according to the requirements of a user. For example, an implementation service qualifier 209 may be defined by a user. The user-defined implementation service qualifier 209 may then be associated with an SCA implementation 208.

An SCA interface 210, in one embodiment, defines how an SCA component, such as an SCA implementation 208, a service import 206, or a service export 216, may be connected to another SCA component to share a business resource. The SCA interface 210 may be defined using a declarative definition consisting of human readable code processed by an interpreter and written in a markup language, such as service component definition language (SCDL) derived from XML.

In one embodiment, the SCA interface 210 may have an associated interface service qualifier 211 that controls how the SCA interface 210 is processed by the integration server 104. The integration server 104, in one embodiment, may be required to honor the interface service qualifier 211 by augmenting the processing of the SCA interface 210 to satisfy the requirements of the interface service qualifier 211 associated with the SCA interface 210.

The interface service qualifier 211, in one embodiment, may require the integration server 104 to process the SCA interface 210 with requirements specified by the interface qualifier 211. For example, a qualifier associated with an SCA interface 210 may require the SCA interface 210 to use a specific communications protocol in order to process the SCA interface 210. In this example, the integration server 104 honors the requirements set forth in the interface service qualifier 211 and processes the SCA interface using the specified communications protocol.

In another embodiment, the service manager module 204 includes one or more predefined, standard interface service qualifiers 211 that can be associated with an SCA interface 210. In a further embodiment, more than one interface service qualifier 211 may be associated with an SCA interface 210.

In another embodiment, the service manager module 204 is configured to allow a user to define an interface service qualifier 211 that requires the integration server 104 to augment the processing of an SCA interface 210 according to the requirements of the user. For example, an interface service qualifier 211 may be defined by a user and associated with an SCA interface 210.

An SCA reference 214, in one embodiment, defines a dependency between an SCA component, such as an SCA implementation 208, a service import 206, or a service export 216, and another SCA component to share a business resource. The SCA reference 214 may be defined using a declarative definition consisting of human readable code processed by an interpreter and written in a markup language, such as service component definition language (SCDL) derived from XML.

In one embodiment, the SCA reference 214 may have an associated reference service qualifier 215 that controls how the SCA reference 214 is processed by the integration server 104. The integration server 104, in one embodiment, may be required to honor the reference service qualifier 215 by augmenting the processing of the SCA reference 214 to satisfy the requirements of the service qualifier associated with the SCA reference 214. Examples of reference service qualifiers 215 include transaction qualifiers, security qualifiers, asynchronous reference qualifiers, and so on.

In one embodiment, a reference service qualifier 215 associated with an SCA reference 214 comprises a declarative statement consisting of human readable code processed by an interpreter and written in a markup language, such as service component definition language (SCDL) derived from XML. In another embodiment, the service manager module 204 includes one or more predefined, standard reference service qualifiers 215 that can be associated with an SCA reference 214. In a further embodiment, more than one reference service qualifier 215 may be associated with an SCA reference 214.

In another embodiment, the service manager module 204 is configured to accept a user defined reference service qualifier 215 that requires the integration server 104 to augment the processing of an SCA reference 214 according to the requirements of the user. For example, a reference service qualifier 215 may be defined by a user and associated with an SCA reference 214.

An SCA wire 212, in one embodiment, defines a physical communication link between an SCA reference and an interface. The SCA wire 212 may comprise a declarative definition consisting of human readable code processed by an interpreter and written in a markup language, such as service component definition language (SCDL) derived from XML.

In one embodiment, the SCA wire 212 may have an associated wire service qualifier 213 that controls how the SCA wire 212 is processed by the integration server 104. The integration server 104, in one embodiment, may be required to honor the wire service qualifier 213 by augmenting the processing of the SCA wire 212 to satisfy the requirements of the wire service qualifier 213 associated with the SCA wire 212. Examples of wire service qualifiers 213 include transaction qualifiers, security qualifiers, asynchronous reference qualifiers, and so on.

In another embodiment, the service manager module 204 is configured to allow a user to define a wire service qualifier 213 that requires the integration server 104 to augment the processing of an SCA wire 212 according to the requirements of the user. For example, a wire service qualifier 213 may be defined by a user and associated with an SCA wire 212.

Additional representative embodiments of an apparatus, system, and method for a programming model for declarative service component qualifiers associated with different levels of SCA components are described in the following examples.

The SCA qualifier model, in one embodiment, allows you to provide extended qualities of service (QoS) to service component clients 106 and SCA services themselves without having to change the service component client 106 or the SCA implementation 208. The SCA qualifier model allows service component clients 106 and SCA implementations 208 to focus on solving business problems. Quality of service examples are transactions, security, and so on.

In one embodiment, SCA QoS is specified through the use of qualifiers in SCA component definitions. SCA qualifiers may define how much management must be provided for an SCA. An SCA enabled run-time, in one embodiment, provides this management capability on-demand (i.e. there is only as many run-time resources present as the SCA needs, for example memory space).

The need to exploit any qualifiers may be derived from the requirements of the business logic or deployment environment. An SCA enabled run-time need not require the use of qualifiers.

In one embodiment, qualifiers can be specified on, and associated with an SCA reference 214, an SCA interface 210, and/or an SCA implementation 208.

Qualifiers may affect the way an interaction between a service component client and a target SCA service provider 102 takes place. Depending on the qualifiers specified, the SCA enabled run-time may be required to augment the base implementation with additional processing.

The SCA qualifier model in one embodiment allows a user to define quality of service (QOS) extensions in an SCA component and/or stand-alone SCA reference definitions. Qualifiers may be specified in several locations within the definition of an SCA component. Generally, those locations are an SCA interface 210, an SCA reference 214, and an SCA implementation 208.

The following example code shows one embodiment of locations where qualifiers can be specified in an SCA component definition. An <interfaceQualifier/> may be placed after an <interfaces> tag in an SCDL component definition. A <referenceQualifier/> may be placed after a <references> tag in an SCDL component definition. An <implementationQualifier/> may be placed after an <implementation> tag in an SCDL component definition.

The qualifiers can also be specified in a stand-alone SCA reference definition. So qualifiers can be specified at the following locations:
  references
    reference—overrides the one specified on the references level
  interfaces
    interface—overrides the one specified on interfaces level
  method—overrides the one specified on the interface level
  implementation In one embodiment, the SCA qualifier model defines a set of standard qualifiers types. The elements interfaceQualifier, referenceQualifier, and implementationQualifier may be defined as global elements in the SCDL schema and function as heads of XML schema substitution groups. A new qualifier type may be created by creating a global element for the qualifier and adding it depending on location requirements to one of the substitution groups interfaceQualifier, referenceQualifier, or implementation qualifier, and creating a complex type for the former element to capture the qualifiers needs, the new type may be derived directly or indirectly from the type used for the head element of the substitution group (i.e. InterfaceQualifier, ReferenceQualifier, or ImplementationQualifier)

The following example code shows one embodiment of a transaction qualifier definition in an SCDL schema. Notice that its element is part of the implementationQualifier substitution group, and that the elements type extends the ImplementationQualifier base type. In one embodiment, the transaction qualifier can be specified wherever implementation qualifiers are supported.

```
<!-- Transaction policies -->
<element  name="transaction"
          type="Transaction"
          substitutionGroup="scdl:implementationQualifier" />
<complexType name="Transaction">
    <complexContent>
        <extension base="scdl:Implementation Qualifier">
            <attributename="value" type="scdl:TransactionAttribute"
                use="required" default="Required"/>
        </extension>
    </complexContent>
</complexType>
<simpleType name="TransactionAttribute">
    <restriction base="string">
        <enumeration value="Required"/>
        <enumeration value="RequiresNew"/>
        <enumeration value="NotSupported"/>
    </restriction>
</simpleType>
```

Qualifiers may be used according to the substitutionGroup that they are part of. So either on SCA interfaces 210, SCA references 214, or SCA implementations 208. The next sections of example code show an SCA component definition with two qualifiers. One is the securityPermission qualifier, which is an interface qualifier. The other is the transaction qualifier, which is an implementation qualifier.

```
<scdl:component name="process/myvalue/MyValue"
        xmlns:xsi="http: . . . "
        xmlns:java="http: . . . "
        xmlns:scdl="http: . . . ">
<interfaces>
    <securityPermission role="gold"/>
<interface xsi:type="java:JavaInterface"
    interface="process.myvalue.MyValue" />
</interfaces>
    <references>
    <reference name="customerInfo">
        <interface   xsi:type="java:JavaInterface"
                    interface=" service.customerinfo.CustomerInfo " />
    </reference>
    <reference name="stockQuote">
        <interface   xsi:type="java:JavaInterface"
                    interface=" service.stockquote.StockQuote " />
    </reference>
</references>
<implementation   xsi:type="java:JavaImplementation"
                  javaClass name="process.myvalue.MyValueImpl" >
    <transaction value="RequiresNew" />
</implementation>
</scdl:component>
```

In one embodiment, one or more standard, pre-defined service qualifiers may be supported by an SCA enabled run-time. Several examples of pre-defined service qualifiers follow. For each qualifier type the following details are provided: Type—the XML representation of the type, Description—a functional description of the QOS provided, location—the valid placement of the qualifier within the component definition, and Constraints—restrictions on the usage of the qualifier The transaction qualifier is defined as follows: <transaction value="Required or RequiresNew or NotSupported"/> with type "transaction," Description "The transaction qualifier provides declarative transaction demarcation support for SCA services." The Transaction qualifier can be set to the following values: Required (default)—RequiresNew—noTransaction. The location is set as "The transaction qualifier may be specified within the implementation section of an SCA component definition." The qualifier has no constraints.

Other examples of qualifiers include Asynchronous Reference Qualifiers that extend the support for the asynchronous invocation of SCA services, the qualifiers are requestExpiration, responseExpiration, and reliability. The requestExpiration qualifier is defined as follows: <requestExpiration value="<milliseconds>"/>. The responseExpiration qualifier is defined as follows: <responseExpiration value="<milliseconds>"/>. The reliability qualifier is defined as follows: <reliability value="assured or bestEffort"/>.

The requestExpiration qualifier lets the client specify the length of time after which an asynchronous request is to be discarded if it hasn't been delivered, beginning from the time when the request is issued. The responseExpiration qualifier lets the client specify the length of time that an SCA enabled run-time must retain an asynchronous response or must provide a callback, beginning from the time when the request is issued. The value of both qualifiers is specified in milliseconds. A value of zero denotes an indefinite expiration.

The reliability qualifier determines the quality of asynchronous message delivery. In general there is a trade-off between the reliability of message delivery and performance. Better performance usually means less reliable message delivery. The reliability qualifier may take values. The asynchronous invocation qualifiers may be specified on reference definitions. Constraints: The asynchronous invocation qualifiers take effect only when the asynchronous programming model is used by an SCA client. All three qualifiers may be used in combination.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for implementing service qualifiers that define on-demand management requirements for a loosely coupled software service in a service component architecture (SCA) for an integration server, the system comprising:

an SCA service provider configured to supply an SCA service wherein the SCA service is loosely coupled;

a service architecture configured to facilitate communication of an SCA service;

an integration server configured to act as an intermediary between SCA service providers and to augment an implementation execution of an SCA service on-demand during runtime of the integration server; and a service manager module comprising one or more of logic hardware and executable code, the executable code stored on a computer readable storage medium, the service manager module configured to:

receive a plurality of user-defined, declarative, Quality of Service (QoS) service qualifiers from a user, the QoS service qualifiers each defining an expected level of performance for a single SCA subcomponent, the SCA subcomponent selected from a service reference, an SCA wire, an SCA interface, and an SCA implementation, each QoS service qualifier comprising a declarative statement in service component definition language (SCDL), the declarative statement defining the expected level of service for the SCA subcomponent for processing by an interpreter;

associate each of the QoS service qualifiers with the single SCA subcomponent based on an SCA component definition; and require the integration server to augment an implementation execution for the SCA service to honor the expected level of service from each of the QoS service qualifiers.

2. The system of claim 1, wherein the service manager module further comprises one or more standard, predefined QoS service qualifiers for the single SCA subcomponent.

3. A computer program product comprising a computer readable storage medium having computer usable program code programmed for implementing service qualifiers that define on-demand management requirements for a loosely coupled software service in service component architecture (SCA) for an integration server, the operations of the computer program product comprising:

receiving a plurality of user-defined, declarative, Quality of Service (QoS) service qualifiers from a user, the QoS service qualifiers each defining an expected level of performance for a single SCA subcomponent, the SCA subcomponent selected from a service reference, an SCA wire, an SCA interface, and an SCA implementation, each QoS service qualifier comprising a declarative statement in service component definition language (SCDL), the declarative statement defining the expected level of service for the SCA subcomponent for processing by an interpreter;

associating each of the QoS service qualifiers with the single SCA subcomponent based on an SCA component definition;

requiring the integration server to augment an implementation execution for the SCA service to honor the expected level of service from each of the QoS service qualifiers such that the integration server augments the implementation execution on-demand during runtime of the integration server; and accepting user modification and definition of additional user-defined, declarative, QoS service qualifiers.

* * * * *